June 5, 1934.   P. A. ROTHE   1,961,394
TRAY CARRIAGE
Filed July 2, 1931    2 Sheets-Sheet 1
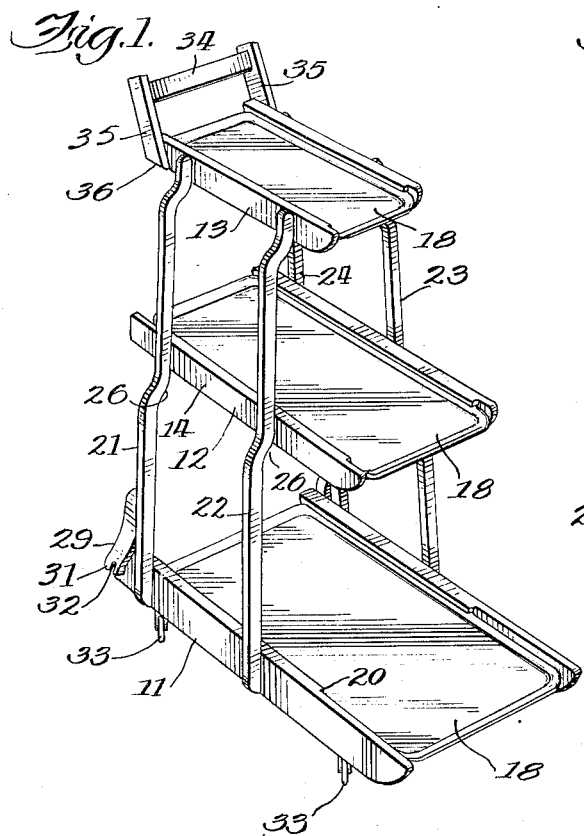
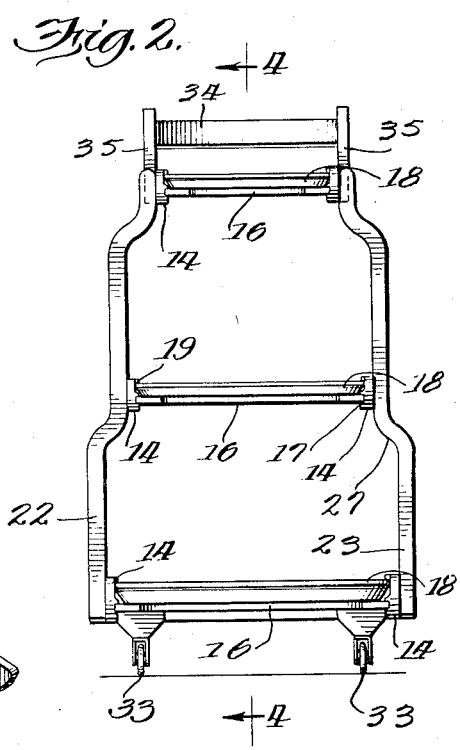
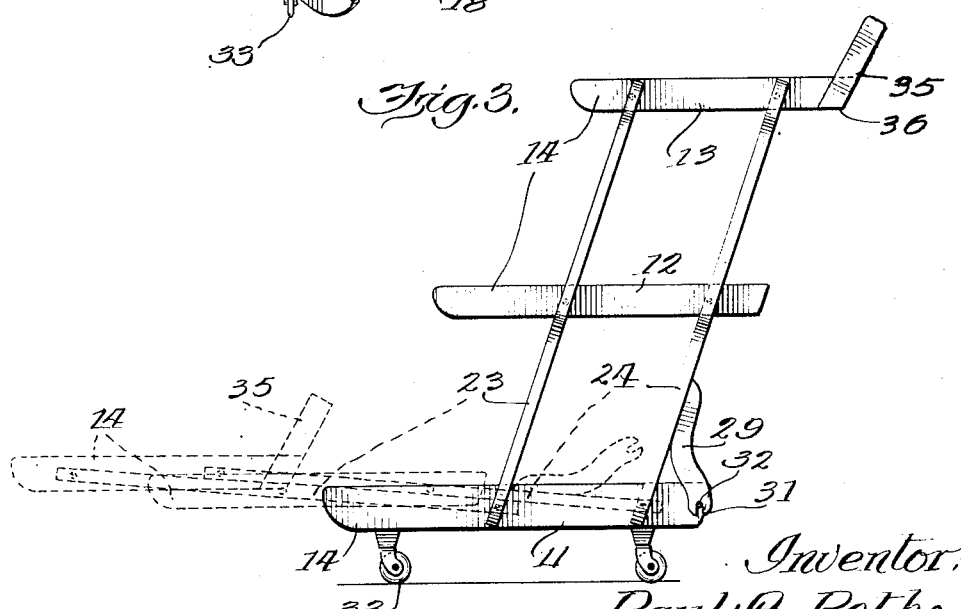
Inventor:
Paul A. Rothe
By Williams, Bradbury,
McCaleb & Hinkle, Attys.

June 5, 1934.  P. A. ROTHE  1,961,394
TRAY CARRIAGE
Filed July 2, 1931  2 Sheets-Sheet 2
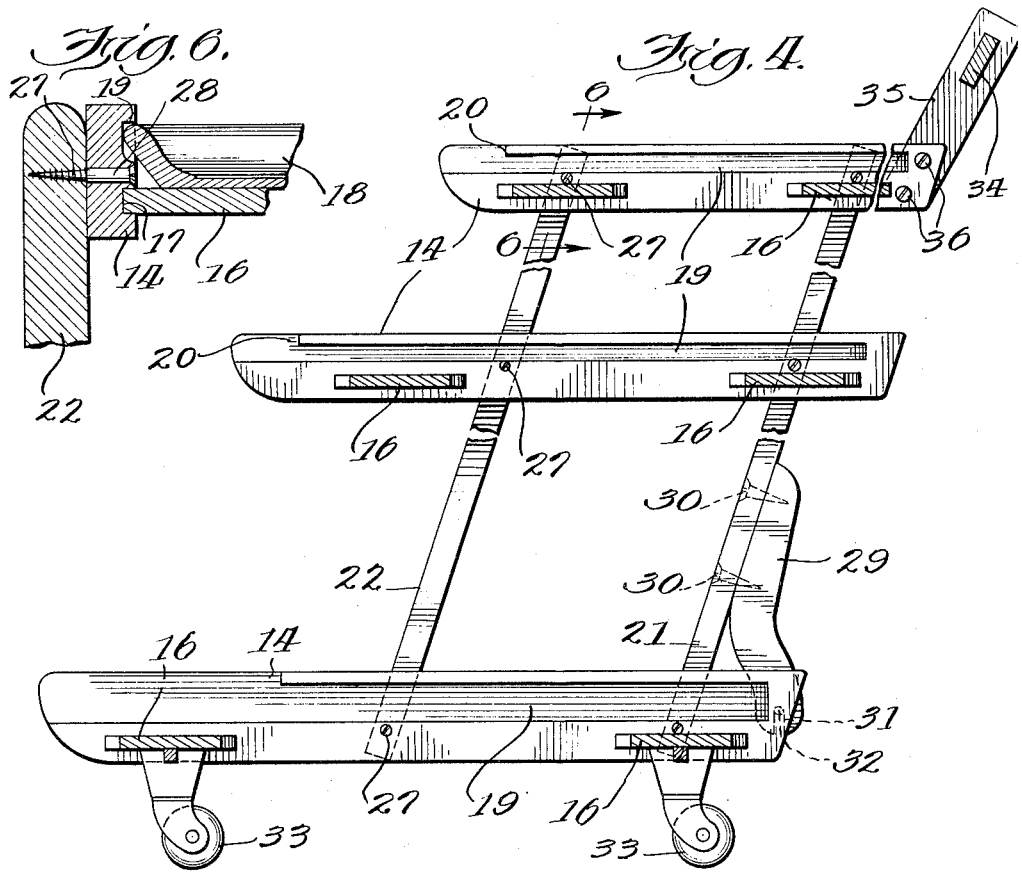
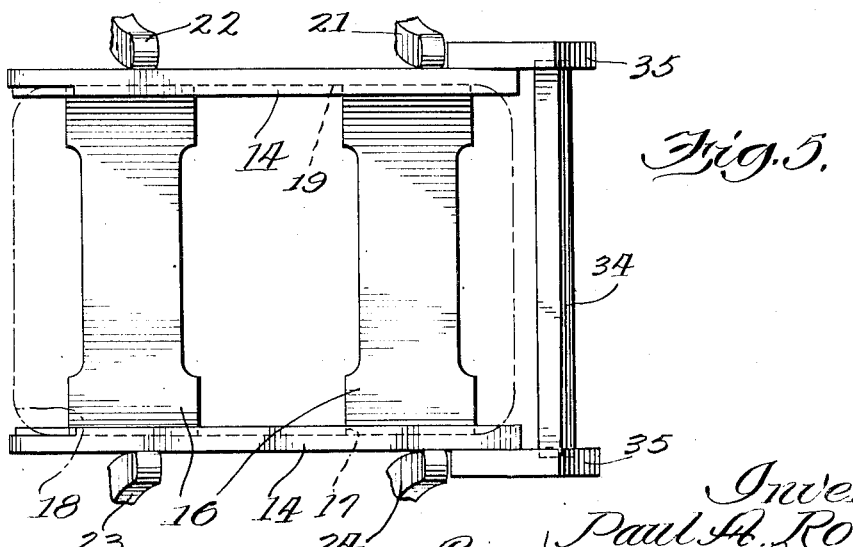

Patented June 5, 1934

1,961,394

UNITED STATES PATENT OFFICE 1,961,394

TRAY CARRIAGE

Paul A. Rothe, Chicago, Ill., assignor to Furniture Stylists, Inc., Chicago, Ill., a corporation of Illinois Application July 2, 1931, Serial No. 548,377

11 Claims. (Cl. 211—130)

My invention relates to tray carriages or devices commonly known as tea carts.

My invention contemplates the provision of a collapsible tray carriage which may be stored in a small space when not in use.

My invention further contemplates providing a collapsible tea wagon which will provide a large amount of space for the conveyance of dishes, food, etc. and from which the trays can be readily removed.

A further object of my invention is to provide a collapsible tea wagon which can be opened and closed with a minimum amount of effort and which will serve as a convenient and sturdy serving table.

Other objects and advantages of my invention will appear more fully from the following description and from the accompanying drawings, in which similar characters of reference indicate similar parts throughout the several views.

Figure 1 is a perspective view of my tea carriage;

Figure 2 is a front elevation thereof;
Figure 3 is a side elevation, the dotted lines showing my tea carriage in a folded position;

Figure 4 is a sectional view taken on the line 4—4 of Figure 2;

Figure 5 is a top elevation with the tray removed but its position indicated in dotted lines;

Figure 6 is a sectional view taken on the line 6—6 of Figure 4.

Briefly, in the practical application of my invention, I provide a plurality of trays removably secured in tray holders. The trays are mounted on a framework in any suitable manner which will allow the collapsing of the entire assembly in a small place.

In the drawings 11, 12 and 13 are tray holders or tray supports mounted so that their center lines are parallel to each other and equidistant from each other, that is, the distance between the tray holder 11 and the tray holder 12 is the same as the distance between the tray holder 12 and the tray holder 13. The tray holders are made up in any acceptable form which will provide a support for trays. As shown in the drawings, they are made up of side members 14 and cross members 16. The cross members are mortised to the side members as at 17 although any other convenient means of securing these two members together may be used. These cross members not only serve to make the construction of the tray supports strong and rigid but also serve to support trays 18 which are slidably positionable in grooves 19 provided in the side members 14 of the tray supports. The top portion of the groove may be cut off as at 20 as to make the groove considerably shorter than the tray to allow easier removal of the tray. In order to make the tray supports together with the trays adaptable to be fitted one within the other the tray supports and the trays are made progressively larger, that is, the top tray holder 13 is adapted to fit within the tray holder 12 and the tray holder 12 is adapted to fit within the tray holder 11.

In order to position the tray holders in their proper relation to each other I provide a plurality of stays 21, 22, 23 and 24 to which the tray holders are pivoted in any suitable manner which will allow relative rotation between the tray holders and the stays. The stays 21 and 22 are parallel to each other and similarly the stays 23 and 24 are also parallel to each other. The stays on opposite sides of the tray supports as at 22 and 23 are bent toward each other or inset at each tray level so that the transverse distance between stays is just sufficient to accommodate the width of the tray support and the stays 21 and 24 are similarly bent for this same purpose. At each point of attachment of a tray support to each stay there is provided a suitable pivot which may be accomplished in several different ways, one of which is shown in Fig. 6. In the manner used to provide this pivot I have employed an ordinary wood screw 27 which is provided with a shoulder 28 of approximately the width of the side support members 14. The side members 14 are bored with holes slightly larger than the diameter of the shoulder 28. The screws 27 are provided with the usual tapered gripping threads for fastening the side members 14 of the tray supports to the stays 21, 22, 23, and 24. It will thus be evident that I have provided a pivot at all points of attachment of the tray supports to the stays and it will further be apparent that the tray supports by means of these pivots can be rotated into collapsed position such that the tray support 13 will fit into the tray support 12 and the tray support 12 will fit into the tray support 11, as shown by the dotted lines in Fig. 3. In order for the trays to be collapsed into a minimum of space the tray supports are parallel to and equidistant from each other. It will further be evident that at any point in the movement of the tray supports as they are pivoted into a collapsed position they will remain parallel to each other and equidistant from each other and that a similar relationship will be maintained when the trays are pivoted from a collapsed to an open position. In order to provide a stop or means of positioning the trays in an open position, I provide stop arms 29 attached in any suitable manner as by screws 30 to the stays 21 and 24. These stop arms are provided with grooves 31 which are adapted to engage pegs 32 positioned on the side members 14 of the lowermost tray holder 11. Wheels or casters 33 are fastened in any approved manner, to the bottom of the lowermost tray holder 11 and a handle 34 may be attached to the uppermost tray holder 13 by arms 35 as at 36.

It will thus be evident that I have provided a portable tray carriage or tea cart from which the trays may be removed very conveniently and which can be collapsed into a minimum space. In providing a collapsible tray carriage of this type it is desirable that opening and closing the device be accomplished with a minimum of effort and it will be apparent upon observation that my tea carriage can be opened from a collapsed position with one movement by grasping the handle 34 and pulling upward until the grooves 31 of the stop arms 29 come in contact with the pegs 32, and also that the tea cart can be folded into its collapsed position in one movement. When the tray carriage is opened the stays are rotated through slightly over 90° so that when in this open position the stays are at an angle to the horizontal and are supported in this position by the stop arms 29 so that an upward movement on the handle 31 is necessary to collapse the tea carriage and that a horizontal force on the handle 34 will allow the tea carriage to be moved from position to position without collapsing.

It will further be noted that the lowermost tray extends considerably beyond the center tray and that the center tray extends beyond the uppermost tray, thus the articles resting on the trays are readily accessible and further it will be noted that the trays may be partially slid out of the grooves formed in the tray holders without removing them from the tray holders, thus making the trays still more accessible.

While I have described one embodiment of my invention it is obvious that changes can be effected therein and I do not wish to be restricted to the embodiment illustrated and described but refer to the appended claims as defining my invention.

What I claim is:

1. A tray carriage comprising a plurality of superposed frames of successively lesser width whereby they may be nested, each frame having means slidingly to receive a tray, and supports pivotally connected with the frames for supporting the frames through parallelogrammatical collapse of the frames and supports to a closed nested position of the frames.

2. In a tray carrying device, a plurality of stays inclined to the horizontal, a plurality of parallel equi-spaced tray holders supported by said stays, said tray holders being pivoted to said stays at the point of their support and having upstanding grooved side members, a tray positionable in each of said grooved tray holders, and means whereby said tray holders may be collapsed one within the other.

3. In a tray carriage device, a plurality of stays inclined to the horizontal, a plurality of parallel equi-distant tray holders pivotally attached to said stays, a plurality of trays, each of said tray holders having grooves adapted to slidably receive one of said trays, and means whereby said tray holders may be collapsed one within the other in one collapsing operation.

4. A tray carriage comprising a plurality of stays, a plurality of vertically equi-spaced parallel frames having ways for slidably receiving and supporting trays, the frames being pivotally attached to and supported by the stays, said stays when in an upright position being inclined to one side of the perpendicular and collapsing, parallelogrammatically with the frames, past the perpendicular through an arc greater than 90° to bring the trays into intimately superposed overlapping relation.

5. A tray carriage comprising a plurality of superposed frames of successively lesser width whereby they may be nested, each frame having means slidingly to receive a tray, and supports pivotally connected with the frames for supporting the frames through parallelogrammatical collapse of the frames and supports to a closed nested position of the frames, said supports comprising a pair of stays on each side of the frames, the stays, as regards their pivotal connection to the frames, being disposed at a slight incline past the perpendicular when the carriage is in its open position, said stays, in such collapsing to nested position of the frames, passing as a continuous movement through the perpendicular through an arc not less than substantially 90°.

6. In a tray carriage, a plurality of tray holders collapsible one within the other, a plurality of stays pivotally supporting said tray holders, said stays being movable from a substantially horizontal position to a position past the vertical, said movement bringing the tray holders into a parallel spaced relationship.

7. In a tray carriage, parallel equispaced tray holders, means for maintaining a parallel equispaced relationship between said tray holders at any point in a collapsing operation comprising a plurality of inwardly bent stays to which said tray holders are pivoted; and means whereby a tray may be slidably positioned in each of said tray holders.

8. In a tray carriage, parallel equispaced tray holders, means for maintaining a parallel equispaced relationship between said tray holders at any point in an unfolding operation said unfolding operation being accomplished in a single unfolding movement; means for holding said tray holders in an open position and means whereby said tray holders may be collapsed one within the other in one collapsing operation.

9. In a tray carriage, a plurality of tray holders having upstanding side members, means for slidably positioning trays in each of said tray holders, the lowermost of said trays extending beyond the center tray, and the center tray extending beyond the uppermost of said trays whereby said trays are readily accessible and means whereby said tray holders with said trays positioned therein may be collapsed one within the other in a compact assembly.

10. In a tray carriage, a plurality of tray holders, a plurality of stays to which said tray holders are pivoted in substantially parallel spaced relationship, each of said stays being bent inwardly at each tray level and each of said tray holders being of successively smaller dimensions whereby said tray holders may be positioned one within the other, means for supporting said tray holders in an open, spaced relationship, said tray holders being movable from said open, spaced relationship to a closed, collapsed position one within the other in a single collapsing operation.

11. In a tray carriage, a lower tray holder, an upper tray holder of such dimensions as to fit within said lower tray holder, said tray holders having upstanding grooved side members, a tray positionable in each of said grooved side members, the lowermost of said trays projecting beyond the uppermost whereby the contents of the lowermost tray are readily accessible, a plurality of inwardly bent stays to which said tray holders are pivoted, and means for supporting said stays in a position inclined to the vertical.

PAUL A. ROTHE.